United States Patent [19]

Nahmias et al.

[11] 3,865,903

[45] Feb. 11, 1975

[54] HEAT SEALABLE ISOTACTIC POLYPROPYLENE AND 1,3 PENTADIENE POLYMER

[75] Inventors: Michael A. Nahmias, Canandaigua, N.Y.; Edward M. Bullard, South Orange, N.J.

[73] Assignee: Mobil Oil Corporation, New York, N.Y.

[22] Filed: Apr. 16, 1973

[21] Appl. No.: 351,211

[52] U.S. Cl. ............................. 260/889, 260/80.7
[51] Int. Cl. ...................... C08d 3/04, C08f 29/12
[58] Field of Search ........................ 260/889, 80.7

[56] References Cited
UNITED STATES PATENTS

| | | | |
|---|---|---|---|
| 3,278,646 | 10/1966 | Lambert, Jr. ................... | 260/897 |
| 3,478,005 | 11/1969 | Wheeler........................... | 260/80.7 |
| 3,509,239 | 4/1970 | Tindall............................. | 260/889 |

Primary Examiner—Murray Tillman
Assistant Examiner—J. Ziegler
Attorney, Agent, or Firm—Andrew L. Gaboriault; Mitchell G. Condos; James D. Tierney

[57] ABSTRACT

A resinous blend composition, and thermoplastic film structures fabricated therefrom having improved physical properties, comprising a polyolefin (e.g., polypropylene) containing a minor amount based on the weight of the polyolefin and sufficient to improve the heat sealing characteristics of films fabricated from such blends, of a normally solid, resinous, random multipolymer of a mixture comprising pentadiene, 1,3 and at least one other hydrocarbon compound containing ethylenic unsaturation copolymerizable therewith. Examples of such ethylenically unsaturated hydrocarbons include cyclopentadiene, isoprene, 2-methylbutene-2, tertiary butylstyrene, $\beta$-pinene, dipentene, $\beta$-phellandrene, $\alpha$-methylstyrene, and mixtures thereof.

16 Claims, No Drawings

HEAT SEALABLE ISOTACTIC POLYPROPYLENE AND 1,3 PENTADIENE POLYMER

BACKGROUND OF THE INVENTION

1. Field of the Invention

The present invention relates to resinous thermoplastic blend compositions suitable for employment in the fabrication of thermoplastic films and, in particular, oriented thermoplastic films such as oriented polypropylene. Certain uncoated, oriented films such as polypropylene have relatively high heat sealing temperatures and narrow heat sealing ranges in contrast to other available thermoplastic films such as polyethylene, for example. Additionally, oriented films such as oriented polypropylene exhibit a tendency to disorient, shrink, and tear when attempts are made to heat seal them at their prerequisitely high heat sealing temperature.

In accordance with the present invention, a minor amount (e.g., from about 5 percent to about 40 percent by weight) of a normally solid resin interpolymer of pentadiene with at least one other hydrocarbon having ethylenic unsaturation copolymerized therewith, is blended with polypropylene resin prior to extrusion of the polypropylene into a film structure. Specific embodiments of such normally solid resins include a multipolymer of a mixture of pentadiene, isoprene, cyclopentadiene and at least one of the following: 2-methylbutene-2, t-butyl-styrene, β-pinene, β-phellandrene, dipentene, α-methylstyrene and mixtures thereof; and still more specifically, such multipolymers derived from a mixture comprising pentadiene and 2-methylbutene-2 as its major components (and preferably in about equal parts by weight); mixtures thereof with t-butylstyrene, or with beta-pinene, or with a mixture of alpha methyl styrene, dipentene and beta-phellandrene. Oriented polypropylene film structures prepared from such resinous blend mixtures have been found to exhibit substantially lower minimum heat seal temperatures, thereby broadening its heat seal range. The interpolymer containing film has improved optical properties and a significantly improved, or higher, tensile modulus or stiffness thereby improving the film's processability on automatic packaging equipment.

The heat sealing characteristics of the novel film compositions of the present invention may be further improved by subjecting such films to electronic treatment such as corona discharge treatment utilizing techniques which are well known in the art.

2. Description of the Prior Art

U.S. Pat. No. 3,278,646 describes the employment of terpene polymers, such as β-pinene for example, in additive amounts to improve the heat seal characteristics of oriented polypropylene film. However, such blends have, in instances, been found to have poor surface properties, increased blocking, narrow sealing ranges and poor dimensional stability. Other attempts to remedy the heat sealing difficulties of such oriented films include providing the film with a coating of material that is more heat sensitive and hence sealable at a lower temperature than the film itself. However, such coating techniques are both time consuming and costly, involving the formulation of special coating materials, special treatment of the film surface to insure coating adhesion as well as necessitating the employment of film coating equipment. Additionally, in many instances such coatings have been found to have an adverse effect on film physical properties such as increasing the blocking tendency of the coated films, reducing the film optical properties, and causing higher coefficients of friction.

SUMMARY OF THE INVENTION

In accordance with the present invention, resinous compositions are provided which may be employed in the fabrication of oriented polypropylene film which exhibits lower minimum heat seal temperatures, broadened heat seal temperature ranges and increased tensile modulus when compared to oriented polypropylene films which do not contain the modifying additive embodied for use herein. The novel resinous blend compositions of the present invention comprise polypropylene resin, as well as blends thereof with other thermoplastic resinous materials such as polybutene and copolymers thereof such as ethylene butene-1 copolymer, in admixture with a minor amount sufficient to improve the heat sealing characteristics of the film fabricated from such blends, as for example on the order of from about 5 percent to about 40 percent by weight, and preferably from about 10 percent to about 30 percent by weight of a random, normally solid resin interpolymer of pentadiene with at least one other hydrocarbon having ethylenic unsaturation as hereinafter defined. The normally solid resin may be prepared by copolymerization of pentadiene 1-3 with a hydrocarbon compound containing ethylenic unsaturation, such as, for example, methyl butenes, tertiary butylstyrene, beta-pinene, β-phellandrene, dipentene, α-methylstyrene and mixtures thereof. Normally solid resinous interpolymers, as embodied for use herein, can be synthesized by employing conventional Friedel-Crafts (e.g., aluminum chloride) catalyzed polymerization reactions of mixtures comprising pentadiene and said other copolymerizable hydrocarbons as more fully described herein. Particularly preferred are such interpolymers that have a melting point in the range of about 70° to about 140° C (ring and ball).

DESCRIPTION OF SPECIFIC EMBODIMENTS

The interpolymer materials which may be used in accordance with the present invention to improve oriented film properties are random, normally solid, resinous multipolymers which include (A) interpolymers of pentadiene with another hydrocarbon having ethylenic unsaturation copolymerizable therewith (e.g. diolefins, including cyclopentadiene and isoprene), and (B) copolymers of (A) in mixture with one or more of the following: methylbutene; tertiary butylstyrene; beta-pinene; admixtures of β-phellandrene, dipentene and α-methylstyrene. A particularly suitable mixture for preparation of such interpolymers, is a mixture of pentadiene 1-3 and another diolefin or diolefins and, more specifically, a mixture containing as its main components pentadiene 1-3 and 2-methylbutene-2. One source of such mixture is a byproduct in the steam cracking of hydrocarbons for the production of ethylene or propylene and a specific example of which is the following comprising a mixture of $C_5$ hydrocarbons as the major component:

| | |
|---|---|
| 3,3 dimethyl butene-1 | 1.11 |
| trans pentene-2 | 5.85 |
| cis pentene-2 | 3.09 |
| 2-methylbutene-2 | 35.80 |

| | |
|---|---|
| -Continued | |
| 4-methylpentene-1 and 2,3-dimethylbutene-1 | 2.68 |
| isoprene | 3.29 |
| 2-methylpentene-1 and cyclopentene | 2.24 |
| 2-methylpentene-2 and cyclohexene | 0.09 |
| pentadiene 1-3 | 36.30 |
| cyclopentadiene | 0.84 |
| piperylene dimers | 8.72 |

The above olefin stream, containing a high percentage of pentadiene 1,3, is hereinafter referred to as the piperylene concentrate stream employed as the polymerizable mixture for preparing the interpolymers in illustration of specific embodiments of the invention.

Such polymerizable mixtures may per se be polymerized, for use as embodied herein, or in admixture with another ethylenically unsaturated hydrocarbon such as tertiary butylstyrene, β-pinene, dipentene, β-phellandrene α-methylstyrene and mixtures thereof to yield the multipolymer resins employed in the present invention.

In accord with the present invention, it is preferred that the multipolymer resins employed be produced from resinous mixtures which have pentadiene concentrations present in amounts ranging from about 10% to about 75% based on the weight of the polymerizable mixture. More specifically, pentadiene concentrations in the range of from about 15% to about 65% by weight may be advantageously employed to produce the multipolymer resins. For example, when multipolymers are produced from piperylene concentrate-tertiary butylstyrene mixtures, pentadiene 1,3 concentrations present in the polymerizable mixture may preferably range from about 15% to about 40% based on the total weight of polymerizable mixture. More specific embodiments include a polymerizable mixture comprising in weight ratio about 30 to about 80% of an approximately equal part by weight of a mixture of pentadiene 1,3 and methylbutene and 20 to 70% of t-butyl styrene. In the case of polymerizable mixtures comprising piperylene concentrate, dipentene, beta-phellandrene and alpha-methylstyrene, pentadiene 1,3 concentrations in the polymerizable mixture may preferably range from about 15% to about 30% by weight. More specific embodiments include a polymerizable mixture comprising by weight from about 15 to about 30% pentadiene 1,3, 20-40% alpha-methylstyrene, 5-30% dipentene and 2 to 15% beta-phellandrene. It should be understood however that the pentadiene 1,3 concentrations in the foregoing polymerizable mixtures are only preferred ranges and concentrations of pentadiene 1,3 outside such ranges may also be suitably employed.

U.S. Pat. Nos. 3,457,632 and 3,622,551, the disclosures of which are incorporated herein by way of reference, disclose olefinic mixtures of the type which may be employed in preparing the interpolymers useful in practice of the present invention.

The normally solid resinous interpolymers, prepared by use of standard Friedel-Crafts reactions by polymerization, in specific embodiment, of the aforenoted piperylene concentrate, or mixtures thereof with another copolymerizable hydrocarbon or hydrocarbons, can be conveniently polymerized in an inert organic diluent such as toluene. The resulting mixture is then brought into reactive contact with an acid metal halide polymerization catalyst such as anhydrous aluminum chloride, aluminum bromide. stannic chloride, titanium tetrachloride and the like with the aluminum chloride being a preferred embodiment. During the progress of the polymerization reaction, the reaction temperature is maintained within a range which desirably is suitable for relatively rapid polymerization without reaction surge, such as a temperature within the approximate range of 0° C. to about 80° C. Friedel-Crafts' catalyzed reaction techniques suitable for use in preparing the normally solid resinous additives employed in the present invention are described in aforenotes in U.S. Pat. Nos. 3,467,632 and 3,622,551.

In accord with the present invention, it is preferred that the normally solid resinous, interpolymer materials exhibit a melting point range (Ring and Ball) of from about 70° C up to about 140° C.

The polypropylene resins which are particularly suitable for employment in the present invention are essentially isotactic, crystalline polypropylenes which exhibit the following range of properties:

| | |
|---|---|
| Melt Flow Index | 0.5 – 12 |
| Crystalline Melting Point (°F.) | 305 – 340 |
| Inherent Viscosity | 1.4 – 4.0 |
| Molecular Weight (Weight Average) | 100,000 – 600,000 |
| Density (grams/cc.) | 0.89 – 0.91 |

EXAMPLE I

A random multipolymer was prepared by anhydrous aluminum chloride catalyzed interpolymerization in toluene of a mixture comprising by weight 55.3% of the piperylene concentrate hereinbefore described; 9.7% of a mixture comprising dipentene and β-phellandrene present in a weight ratio of about 2:1, respectively; and 35.0% of α-methylstyrene.

| | |
|---|---|
| Melting Point, °C. (Ball and Ring) | 79 – 80 |
| Molecular Weight (Weight Average) | 1442 |
| (Number Average) | 1034 |
| Bromine No. | 6 – 10 |
| Iodine No. | 75 – 80 |
| Acid Value | <1 |
| Specific Gravity | 0.978 – 0.980 |
| Percent Crystallinity | 0 |
| Tg (Glass Transition Temperature) | 32°C. |
| Saponification No. | <1 |
| Viscosity (in toluene - 70%) | f to g |
| Color (50% toluol solution) | Gardner 5 – 7 |
| Decomposition Temperature (in nitrogen) | 205°C. |

The resinous interpolymer, when heated under nitrogen at a rate of 10° C. per minute, had an initial decomposition temperature of 205° C; a 0.0% weight loss at 200° C. a 12.8% weight loss of 300° C.; and a 90.0% weight loss at 400° C.

Such a resinous multipolymer was admixed with molten polypropylene resin by mixing at a temperature of about 350° F. in a Brabender Plasticorder for about 20 minutes. The polypropylene resin employed was a high isotactic, crystalline polypropylene having the following properties:

| | |
|---|---|
| Melt Index | 4–5 |
| Crystalline Melting Point (°F) | 330–340 |
| Inherent Viscosity | 1.4–1.6 |
| Molecular Weight | 100,000–120,000 |
| Density (grams/cc.) | 0.910–0.890 |

Following mixing, the blend was molded into plaques approximately 25 mils thick. The individual plaques were biaxially oriented at temperatures within the range of from about 280° F. up to 310° F., by stretching the plaques about 620 percent in one direction and subsequently stretching the monoaxially oriented plaque, in a direction perpendicular to the first stretch direction, about 400 percent. The final gauge of the additive containing biaxially oriented film samples was about 0.75 mil. The film samples were subsequently subjected to a corona discharge treatment to obtain a treatment level corresponding to at least 36 dynes/cm. wetting tension on one side of the film surface.

In the following Table I, various physical properties of the biaxially oriented films, produced as described in Example I are given and compared to the biaxially oriented polypropylene film devoid of the interpolymer as well as to biaxially oriented film containing a prior art additive, namely, beta-pinene. The percentage levels are expressed as percent by weight based upon the total weight of the additive containing sample.

TABLE I

| Additive | None | Example I Multipolymer | | | B-Pinene |
|---|---|---|---|---|---|
| % Additive by wt: | 0 | 10 | 20 | 30 | 30 |
| Haze % | 2.0 | 1.8 | 1.7 | 2.0 | 0.3 |
| Gloss % | 36 | 86.9 | 88.1 | 83.8 | 92 |
| Modulus MD (MPSI) | 488 | 429 | 372 | 373 | 352 |
| TD | 430 | 399 | 406 | 406 | 535 |
| Elongation MD (%) | 50 | 30 | 50 | 70 | 95 |
| TD | 60 | 40 | 50 | 50 | 70 |
| Ultimate MD (MPSI) | 20.1 | 17.6 | 14.9 | 12.7 | 15.0 |
| TD | 23.6 | 18.9 | 18.5 | 13.6 | 22.0 |
| Yield MD (MPSI) | 8.06 | — | 5.5 | 6.2 | 3.2 |
| TD | 8.53 | 5.3 | 6.9 | 6.4 | 10.3 |
| Heat Seal Strength (gr/inch) | | | | | |
| Seal Bar Temp °F | | | | | |
| 5 psi   200 | 0 | 0 | 60 | 40 | 20 |
| 2 sec.  210 | 0 | 10 | 75 | 60 | 25 |
| 220 | 0 | 50 | 120 | 120 | 40 |
| 230 | 0 | 30 | 50 | 75 | 45 |
| 240 | 0 | 165 | 25 | 90 | 50 |
| 250 | 0 | 110 | 80 | 45 | 40 |
| 260 | 0 | 50 | 170 | 90 | 60 |
| 270 | 0 | 45 | 55 | 110 | 80 |
| 280 | 5 | 85 | 90 | 90 | 155 |
| 290 | 20 | 50 | 195 | 145 | 180 |

As is apparent from the data in Table I, the interpolymer-containing films of the present invention exhibited considerably increased heat seal strength and a significantly broadened heat seal temperature range in comparison to the polypropylene film sample devoid of the interpolymer. Additionally, as shown, the interpolymer-containing film showed improved tensile modulus as well as superior optical properties. As also shown in Table I, the film structures of the present invention, when contrasted to films containing the prior art β-pinene additive, exhibit superior heat seal characteristics as well as improved tensile modulus.

The heat seal measurements shown in Table I were obtained from sample film specimens which had been heat sealed together, treated side to untreated side, utilizing a sealing pressure of 5 p.s.i. for a duration or dwell time of 2.0 seconds. The values given for the heat seal strengths, expressed in grams per linear inch, represent the force required to separate the sealed film layers at a rate of about 12 inches per minute employing a Suter heat seal tester.

EXAMPLE II

A random multipolymer was prepared, following the procedure of Example I, by the polymerization of a mixture of 37.5% by weight of the piperylene concentrate; 37.5% by weight of a mixture comprising dipentene and β-phellandrene present in a weight ratio of about 2:1 respectively; and 25.0% by weight of α-methylstyrene. The product multipolymer resin exhibited the following physical properties:

| | |
|---|---|
| Melting Point, °C. | 97° – 100°C |
| Molecular Weight | |
| (Weight Average) | 1888 |
| (Number Average) | 1153 |
| Bromine No. | 12 – 16 |
| Iodine No. | 74 – 84 |
| Acid Value | 1 (maximum) |
| Specific Gravity | 0.996 – 0.997 |
| Percent Crystallinity | 0 |
| Tg (Glass Transition Temperature) | 38°C. |
| Saponification No. | 1 (maximum) |
| Viscosity | |
| (in toluene — 70%) | 1 to O |
| Color | |
| (50% Toluol Solution) | Gardner 5 – 7 |
| Decomposition Temperature | 170°C. |

The resinous multipolymer, when heated under nitrogen at a rate of 10° C., per minute, had an initial decomposition temperature of 170° C.; a 2.0% weight loss at 200° C.; a 13.0% weight loss at 300° C.; and a 77.0% weight loss at 400° C.

The resinous multipolymer was blended with polypropylene and fabricated into film samples following the procedure outlined in Example I.

In the following Table II, various physical properties of the multipolymer-containing, biaxially oriented films produced are given and compared to biaxially oriented polypropylene film devoid of the multipolymer as well as to biaxially oriented film containing the β-pinene prior art additive.

TABLE II

| Additive | None | Example II Multipolymer | | | B-Pinene |
|---|---|---|---|---|---|
| % Additive by wt: | 0 | 10 | 20 | 30 | 30 |
| Haze % | 2.0 | 1.3 | 1.0 | 0.8 | 0.8 |
| Gloss % | 86 | 90 | 92 | 90 | 92 |
| Modulus MD (MPSI) | 488 | 482 | 464 | 453 | 352 |
| TD | 430 | 436 | 596 | 580 | 535 |
| Elongation MD (%) | 50 | 60 | 65 | 80 | 95 |
| TD | 60 | 65 | 25 | 55 | 70 |
| Ultimate MD (MPSI) | 20.1 | 23.3 | 20.4 | 18.3 | 15.0 |
| TD | 23.6 | 23.6 | 19.4 | 24.2 | 22.0 |
| Yield MD (MPSI) | 8.06 | — | 8.3 | 8.9 | 8.2 |
| TD | 8.53 | — | 10.0 | 10.4 | 10.3 |
| Heat Seal Strength (gr/inch) | | | | | |
| Seal Bar Temp °F | | | | | |
| 5 psi   200 | 0 | 10 | 30 | 45 | 20 |
| 2 sec.  210 | 0 | 45 | 80 | 40 | 25 |
| 220 | 0 | 75 | 105 | 65 | 40 |
| 230 | 0 | 95 | 180 | 65 | 45 |
| 240 | 0 | 120 | 210 | 140 | 50 |
| 250 | 0 | 95 | 190 | 125 | 40 |
| 260 | 0 | 45 | 125 | 75 | 60 |
| 270 | 0 | 145 | 240 | 145 | 80 |
| 280 | 5 | 65 | 265 | 210 | 155 |
| 290 | 20 | 55 | 235 | 195 | 180 |

EXAMPLE III

The piperylene concentrate and tertiary butylstyrene were blended to provide a mixture having a 4:1 molar ratio of pentadiene 1,3: tertiary butylstyrene, respectively. This mixture was aluminum chloride polymerized by the procedure as set forth in Example I to yield an interpolymer resin having the following physical properties:

| | |
|---|---|
| Melting Point (°C.) (Ring and Ball) | 93.5 |
| Gardner Color (50% in toluene) | 4 |
| Viscosity (70% in toluene) | L |
| Specific Gravity | 0.9499 |
| Iodine No. (Wijs) | 96 |

EXAMPLE IV

The piperylene concentrate was blended with tertiary butylstyrene to provide a mixture having a 1.79 : 1 molar ratio of pentadiene 1, 3: tertiary butylstyrene, respectively. This mixture was aluminum chloride polymerized as in Example I to yield a multipolymer resin having the following physical properties:

| | |
|---|---|
| Melting Point (°C.) (Ring and Ball) | 100.5 |
| Gardner Color (50% in toluene) | 4 |
| Viscosity (70% in toluene) | k - l |
| Specific Gravity | 0.9319 |
| Iodine No. (Wijs) | 69 |

EXAMPLE V

The piperylene concentrate and tertiary butylstyrene were blended to yield a mixture having a 2.57 : 1 molar ratio of pentadiene 1,3: tertiary butylstyrene, respectively. This mixture was aluminum chloride polymerized as outlined in Example I to yield a copolymer resin having the following physical properties:

| | |
|---|---|
| Melting Point (°C.) (Ring and Ball) | 102°C. |
| Gardner Color (50% in toluene) | 4 |
| Viscosity (70% in toluene) | Q - R |
| Specific Gravity | 0.9524 |
| Iodine No. (Wijs) | 81 |

EXAMPLE VI

A mixture comprising pentadiene 1,3, isoprene and cyclopentadiene in a molar ratio of about 8 : 1 : 1, respectively, was aluminum chloride polymerized as described in Example I to provide a multipolymer resin of the following properties:

| | |
|---|---|
| Melting Point (°C.) (Ring and Ball) | 100°C. |
| Gardner Color (50% in toluene) | 8 |
| Viscosity (70% in toluene) | G - H |
| Specific Gravity | 0.9462 |

EXAMPLE VII

A mixture comprising (a) pentadiene 1,3, isoprene and cyclopentadiene in a molar ratio of about 8 : 1 : 1 respectively, was mixed with (b) beta-pinene in a weight ratio of about 5 : 7 : 1 respectively. This admixture was aluminum chloride polymerized as per Example I to provide a resin of the following properties:

| | |
|---|---|
| Melting Point (°C.) (Ring and Ball) | 101 |
| Gardner Color (50% in toluene) | 6 |
| Viscosity (70% in toluene) | T - U |
| Specific Gravity | 0.9322 |

The multipolymer resins produced in accordance with Examples III, IV, V, VI and VII were blended with polypropylene and fabricated into film samples following the procedure outlined in Example I.

In the following Table III, various physical properties of the multipolymer containing films are given and when compared to the biaxially oriented polypropylene film devoid of the multipolymer resins.

TABLE III

| Additive | | Example III Multipolymer | | | | Example IV Multipolymer | | | |
|---|---|---|---|---|---|---|---|---|---|
| | | 10% | 20% | 30% | 40% | 10% | 20% | 30% | 40% |
| Property | | | | | | | | | |
| COF F/F | | .45 | .44 | .39 | .45 | .45 | .44 | .43 | .50 |
| F/SS | | .20 | .21 | .28 | .24 | .25 | .20 | .27 | .25 |
| Haze (%) | | .9 | .8 | .8 | .8 | 1.0 | .7 | .8 | .8 |
| Gloss (%) | | 90.4 | 90.0 | 89.1 | 92.3 | 91.4 | 91.3 | 91.2 | 93.5 |
| Ball Burst | 72°F | 14.0 | 10.9 | 9.8 | 7.5 | 15.0 | 12.3 | 10.1 | 7.6 |
| (kg-cm/mil) | 0°F | 9.1 | 8.8 | 8.8 | 6.8 | 11.1 | 10.4 | 7.3 | 6.1 |
| Tensile Ult. | MD | 20,300 | 19,700 | 15,300 | 13,100 | 18,900 | 17,900 | 15,300 | 13,700 |
| (psi) | TD | 23,000 | 21,900 | 20,600 | 16,100 | 23,500 | 22,200 | 20,600 | 17,100 |
| Modulus | MD | 364 | 473 | 455 | 450 | 426 | 422 | 506 | 422 |
| (kpsi) | TD | 415 | 429 | 506 | 452 | 463 | 411 | 455 | 433 |
| Elongation | MD | 91 | 85 | 88 | 95 | 95 | 65 | 88 | 68 |
| (%) | TD | 73 | 72 | 77 | 75 | 81 | 80 | 77 | 73 |
| Handle | MD | 17.7 | 20.1 | 14.8 | 15.3 | 14.3 | 15.9 | 15.9 | 18.0 |
| (1 mil equivalent) | TD | 19.1 | 15.4 | 14.3 | 17.6 | 15.6 | 13.0 | 17.5 | 25.5 |
| Blocking (gm/in) | | 0.9 | 3.0 | 14.7 | 28.0 | 0.6 | 1.5 | 8.1 | 10.5 |
| Heat Seals | | | | | | | | | |
| LP (gm/in) | 260°F | 0 | 10 | 20 | 23 | 0 | 0 | 25 | 0 |
| 2 sec., ¼ psi | 280°F | 5 | 8 | 13 | 23 | 3 | 3 | 23 | 18 |
| | 300°F | 20 | 20 | 20 | 23 | 15 | 23 | 23 | 10 |
| Sentinel (gm/in) | 260°F | 0 | 18 | 30 | 25 | 0 | 25 | 10 | 8 |
| ½ sec., 20 psi | 280°F | 3 | 8 | 20 | 25 | 0 | 18 | 33 | 18 |
| | 300°F | 14 | 18 | 13 | 30 | 9 | 10 | 20 | 60 |

TABLE III – Continued

| Additive | | Example III Multipolymer | | | | Example IV Multipolymer | | | |
|---|---|---|---|---|---|---|---|---|---|
| Additive | | Example V Multipolymer | | | | Example VI Multipolymer | | | |
| | | 10% | 20% | 30% | 40% | 10% | 20% | 30% | 40% |
| Property | | | | | | | | | |
| COF F/F | | .42 | .36 | .44 | .51 | .44 | .45 | .40 | .43 |
| F/SS | | .20 | .21 | .10 | .23 | .21 | .18 | .21 | .24 |
| Haze (%) | | 1.2 | .8 | 1.0 | 1.2 | 1.1 | .8 | .7 | .8 |
| Gloss(%) | | 91.6 | 90.5 | 91.4 | 92.7 | 83.5 | 86.9 | 89.7 | 91.0 |
| Ball Burst | 72°F | 15.1 | 12.0 | 9.4 | 7.1 | 7.5 | 8.4 | 7.3 | 5.9 |
| (kg-cm/mil) | 0°F | 12.3 | 8.3 | 7.9 | 5.2 | 5.5 | 5.4 | 6.2 | 5.5 |
| Tensile Ult. | MD | 20,600 | 20,100 | 15,900 | 14,700 | 11,000 | 12,000 | 13,900 | 13,200 |
| (psi) | TD | 21,500 | 21,700 | 18,900 | 19,600 | 11,300 | 11,900 | 16,300 | 19,400 |
| Modulus | MD | 447 | 522 | 491 | 449 | 354 | 404 | 422 | 424 |
| (kpsi) | TD | 413 | 454 | 509 | 492 | 325 | 360 | 451 | 428 |
| Elongation | MD | 91 | 82 | 67 | 88 | 103 | 85 | 98 | 115 |
| (%) | TD | 75 | 88 | 78 | 85 | 127 | 88 | 87 | 85 |
| Handle | MD | 11.0 | 14.3 | 16.9 | 19.5 | 14.7 | 13.6 | 14.7 | 17.1 |
| (1 mil equivalent) | TD | 11.3 | 18.4 | 18.2 | 19.9 | 13.8 | 17.8 | 18.0 | 19.1 |
| Blocking (gm/in) | | 0.8 | 2.0 | 5.0 | 22.3 | 1.5 | 3.2 | 6.7 | 13.9 |
| Heat Seals | | | | | | | | | |
| LP (gm/in) | 260°F | 0 | 0 | 8 | 30 | 5 | 3 | 18 | 28 |
| 2 sec., ¼ psi | 280°F | 3 | 5 | 13 | 23 | 13 | 5 | 28 | 38 |
| | 300°F | 13 | 5 | 25 | 35 | 35 | 43 | 90 | 13 |
| Sentinel (gm/in) | 260°F | 0 | 10 | 20 | 5 | 5 | — | 30 | 30 |
| ½ sec., 20 psi | 280°F | 0 | 13 | 50 | 15 | 18 | 8 | 23 | 53 |
| | 300°F | 10 | 18 | 13 | 5 | 38 | 13 | 33 | 30 |

| Additive | | Example VII Multipolymer | | | |
|---|---|---|---|---|---|
| | | 10% | 20% | 30% | 40% |
| Property | | | | | |
| COF F/F | | .40 | .47 | .46 | .45 |
| F/SS | | .21 | .16 | .26 | .24 |
| Haze (%) | | .4 | .7 | 1.0 | 1.0 |
| Gloss(%) | | 89.8 | 92.0 | 91.0 | 86.5 |
| Ball Burst | 72°F | 11.8 | 13.1 | 9.6 | 6.9 |
| (kg-cm/mil) | 0°F | 10.0 | 10.2 | 8.5 | 6.4 |
| Tensile Ult. | MD | 20,100 | 19,100 | 17,300 | 13,600 |
| (psi) | TD | 21,600 | 22,200 | 20,900 | 18,400 |
| Modulus | MD | 488 | 493 | 474 | 453 |
| (kpsi) | TD | 360 | 506 | 497 | 492 |
| Elongation | MD | 89 | 62 | 100 | 93 |
| (%) | TD | 85 | 87 | 88 | 95 |
| Handle | MD | 14.7 | 19.3 | 16.9 | 18.6 |
| (1 mil equivalent) | TD | 14.1 | 20.6 | 19.0 | 18.1 |
| Blocking (gm/in) | | 0.6 | 2.4 | 6.0 | 16.3 |
| Heat Seals | | | | | |
| LP (gm/in) | 260°F | 0 | 8 | 45 | 20 |
| 2 sec., ¼ psi | 280°F | 5 | 20 | 23 | 18 |
| | 300°F | 18 | 33 | 43 | 35 |
| Sentinel (gm/in) | 260°F | 0 | 10 | 20 | 13 |
| ½ sec., 20 psi | 280°F | 0 | 20 | 30 | 40 |
| | 300°F | 13 | 18 | 18 | 30 |

As seen from preceding Table III, polypropylene films containing the additive multipolymer resins of Examples 3,4,5,6 and 7 exhibited considerably increased heat seal strength and a significantly broadened heat seal temperature range in comparison to the polypropylene film sample devoid of the multipolymer resins. Additionally, the additive containing films exhibited increased tensile modulus.

Although the present invention has been described with preferred embodiments, it is to be understood that modifications and variations may be resorted to, without departing from the spirit and scope of this invention, as those skilled in the art will readily understand.

What is claimed is:

1. A resinous blend composition comprising a blend of an essentially isotactic, crystalline polypropylene containing, a minor amount, sufficient to improve the heat sealability of film prepared therefrom, of from about 5% to about 40% by weight of a normally solid, resinous, random multipolymer of a mixture comprising pentadiene 1,3 and at least one other compound containing ethylenic unsaturation copolymerizable therewith.

2. A resinous blend composition in accordance with claim 1 wherein said multipolymer comprises pentadiene 1-3 copolymerized with a member selected from the group consisting of cyclopentadiene, isoprene, 2-methylbutene-2, tertiary butylstyrene, β-pinene, dipentene, β-phellandrene, α-methylstyrene, and mixtures thereof.

3. A resinous blend composition in accordance with claim 1 wherein said multipolymer comprises pentadiene 1,3 copolymerized with tertiary butylstyrene.

4. A resinous blend composition in accordance with claim 1 wherein said multipolymer comprises pentadiene 1,3 copolymerized with cyclopentadiene, isoprene and 2-methylbutene-2.

5. A resinous blend composition in accordance with claim 1 wherein said multipolymer comprises pentadiene copolymerized with β-pinene.

6. A resinous blend composition in accordance with claim 1 wherein said multipolymer comprises pentadiene 1-3 copolymerized with dipentene, β-phellandrene and α-methylstyrene.

7. A resinous blend, as defined in claim 1, wherein the multipolymer has a melting point of about 70° to about 125° C.

8. An oriented essentially isotactic crystalline polypropylene film containing a minor amount by weight, sufficient to improve the heat seal characteristics of said film, of from about 5% to about 40% by weight of a normally solid, resinous, random, multipolymer of a mixture comprising pentadiene 1-3 and at least one other hydrocarbon compound containing ethylenic unsaturation copolymerizable therewith.

9. A film in accordance with claim 8 wherein said multipolymer comprises pentadiene 1-3 copolymerized with a member selected from the group consisting of cyclopentadiene, isoprene, 2-methylbutene-2, tertiary butylstyrene, β-pinene, dipentene, β-phellandrene, α-methylstyrene, and mixtures thereof.

10. A film in accordance with claim 8 wherein said multipolymer comprises pentadiene 1,3 copolymerized with tertiary butylstyrene.

11. A film in accordance with claim 8 wherein said multipolymer comprises pentadiene 1-3 copolymerized with cyclopentadiene, isoprene and 2-methylbutene-2.

12. A film in accordance with claim 8 wherein said multipolymer comprises pentadiene copolymerized with β-pinene.

13. A film as defined in claim 8 wherein the multipolymer has a melting point of from about 70° to about 125° C.

14. A film in accordance with claim 8 wherein said multipolymer comprises pentadiene 1-3 copolymerized with dipentene, β-phellandrene and α-methylstyrene.

15. An oriented, crystalline, polypropylene film, as defined in claim 8, containing about 5% to about 40% by weight of a normally solid, resinous, random, multipolymer of a mixture comprising from about 15% to about 30% by weight of pentadiene 1-3, from about 20% to about 40% by weight of α-methylstyrene, from about 5% to about 30% by weight of dipentene, and from about 2% to about 15% by weight of βphellandrene.

16. An oriented, crystalline, polypropylene film as defined in claim 15 wherein said multipolymer has a melting point of from about 70° to about 125°C.

* * * * *